United States Patent

[11] 3,584,298

| [72] | Inventor | John M. Kolbiaz<br>Chicago, Ill. |
|---|---|---|
| [21] | Appl. No. | 809,216 |
| [22] | Filed | Mar. 21, 1969 |
| [45] | Patented | June 8, 1971 |
| [73] | Assignee | Sun Electric Corporation |

[54] FREQUENCY DETECTION APPARATUS INCLUDING VOLTAGE RESPONSIVE MEANS COUPLING FIRST AND SECOND CAPACITOR CHARGE-DISCHARGE CIRCUITS
3 Claims, 4 Drawing Figs.

[52] U.S. Cl. ..................................................... 324/78,
307/233, 307/246
[51] Int. Cl. ...................................................... G01r 23/02
[50] Field of Search ........................................... 324/78 E,
78 Q; 307/233, 246, 322, 274

[56] References Cited
UNITED STATES PATENTS

| 3,139,539 | 6/1964 | Hewett | 324/78UX |
| 3,181,009 | 4/1965 | Felchecic | 307/274X |
| 3,414,770 | 12/1968 | Pudewill | 307/233X |
| 3,419,736 | 12/1968 | Walsh | 307/246X |
| 3,421,022 | 1/1969 | Laupretre | 307/322X |
| 3,502,904 | 3/1970 | Bordonaro | 307/233 |

Primary Examiner—Alfred E. Smith
Attorney—Molinare, Allegretti, Newitt & Witcoff ABSTRACT: A device for indicating whether the frequency of periodic electrical signals is greater than or less than a predetermined frequency comprising a capacitive charging circuit that is normally discharged through a transistor in response to the periodic signals, and a negative resistance device. If the frequency of the periodic signals decreases below the predetermined frequency, the capacitive charging circuit charges to a voltage sufficient to activate the negative resistance device. Activation of the negative resistance device energizes a switch circuit that, in turn, operates an output means, such as a light bulb, in order to indicate that the frequency of the periodic signals is less than the predetermined frequency. Alternatively, if the frequency of the periodic signals increases above the predetermined frequency, the capacitive charging circuit is discharged by the transistor so that activation of the negative resistance device is prevented. This mode of operation is also used to operate an output means in order to indicate that the frequency of the periodic signals is greater than the predetermined frequency.

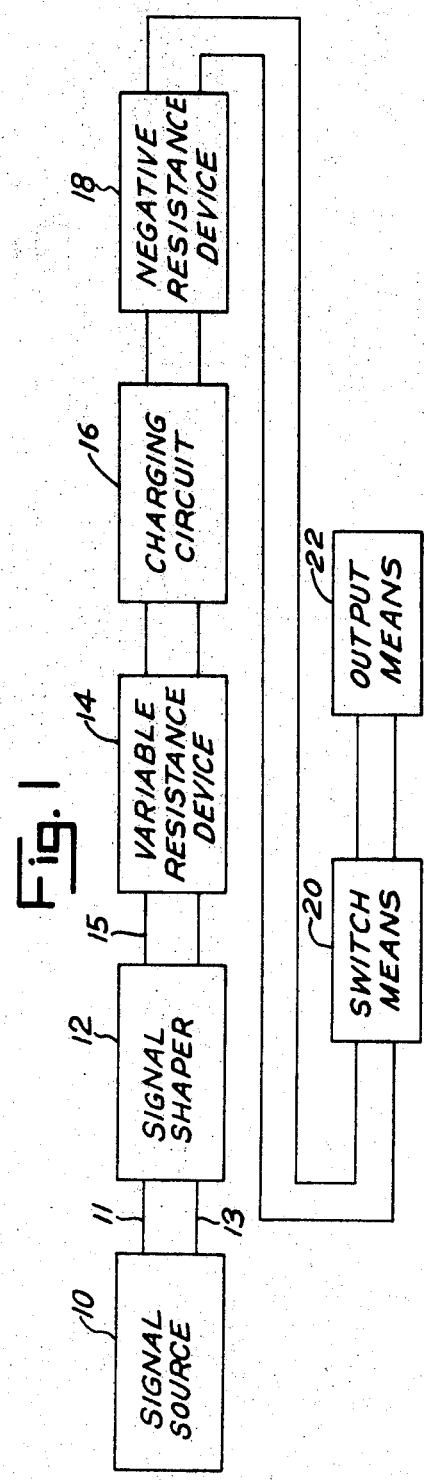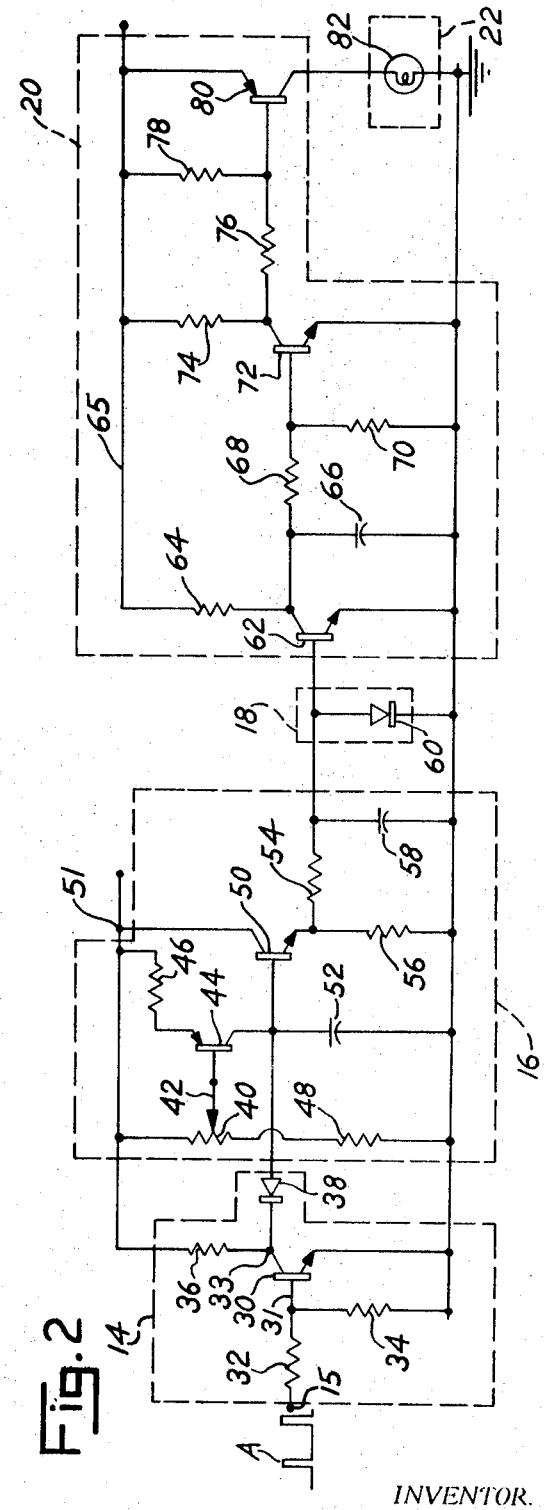

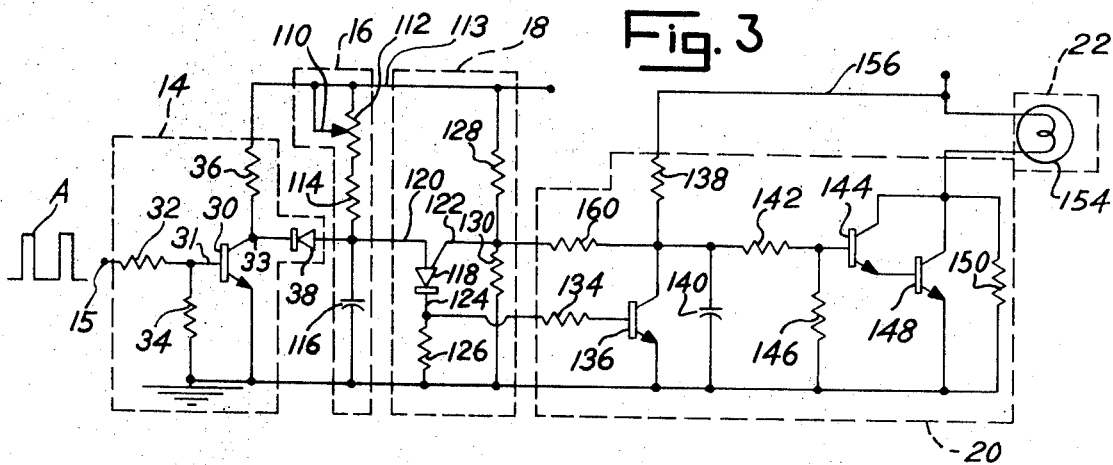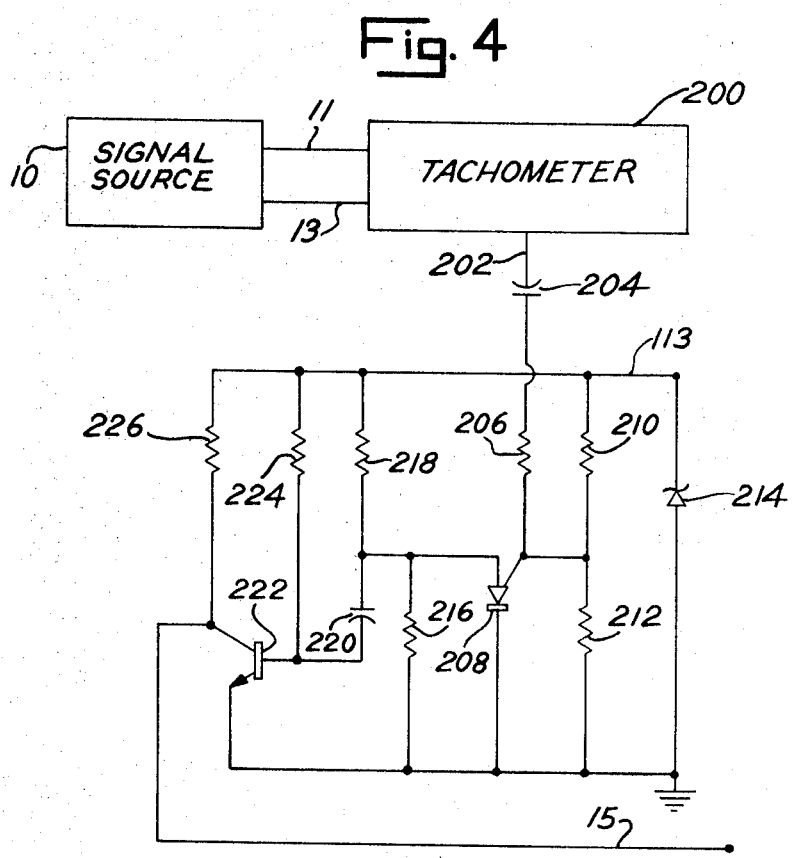

FREQUENCY DETECTION APPARATUS INCLUDING VOLTAGE RESPONSIVE MEANS COUPLING FIRST AND SECOND CAPACITOR CHARGE-DISCHARGE CIRCUITS

BACKGROUND OF THE INVENTION

This invention relates to speed or rate-measuring apparatus, and is more specifically directed to apparatus that indicates whether the frequency of a periodic electrical signal is greater than or less than a predetermined frequency.

There are many uses for a device capable of positively indicating whether a piece of equipment is operating at a speed greater than or less than desired speed. For example, such a device could be used to operate a light bulb mounted on the dashboard of an automobile in order to indicate to the driver that he has exceeded a predetermined engine or vehicular speed. In another application, such a device could be used to automatically select the proper range of a multirange tachometer or a dynamometer as the speed of an engine being tested by such a meter is increased or decreased from one range to another. In a lift-fork apparatus, such a device could be used to apply a brake or to apply power from a secondary motor when the speed of the primary motor operating the lift-fork decreases below a predetermined rate due to the weight of the load being carried. Although speed indicating devices of the type described have been built in the past, each has exhibited deficiencies with regard to accuracy, speed of operation, reliability, and cost that have severely limited its usefulness.

SUMMARY OF THE INVENTION

It has been found that devices of the foregoing type may be operated in response to periodic electrical signals having a frequency proportional to the speed of the equipment being operated. In the case of internal combustion engines, such periodic signals may be derived from the ignition systems thereof. In other applications, transducers capable of producing periodic electrical signals in response to mechanical movement may be used as a source of such signals. Accordingly, the present invention points out whether the speed of a piece of equipment is greater than or less than a desired speed by indicating whether the frequency of periodic electrical signals produced by the equipment is greater than or less than a desired frequency.

The foregoing result is achieved by providing apparatus comprising a capacitive charging circuit that is periodically discharged through a variable resistance device in response to the periodic electrical signals, a voltage responsive device that is switched when the capacitive charging circuit charges to a predetermined voltage, a switch device that is actuated by the switching of the voltage responsive device, and an output means, such as a light bulb, that is operated by the actuation of the switch device.

In a preferred embodiment of the invention, if the frequency of the periodic electrical signals is greater than the desired frequency, the variable resistance device discharges the capacitive charging circuit frequently enough to prevent it from charging to a voltage sufficient to switch the voltage responsive device. As a result, the switch device causes the light bulb to be lighted. However, if the frequency of the periodic electrical signals declines below the desired frequency, the variable resistance device is not operated as frequently, and the capacitive charging circuit rapidly charges to a voltage sufficient to switch the voltage responsive device. Switching of the voltage responsive device energizes the switch device such that it turns off the light bulb. Extinguishing the light bulb indicates that the frequency of the periodic electrical signals being measured has declined below the desired frequency.

The present invention is extremely rugged, inexpensive, and reliable, and provides an instantaneous indication when the frequency of the periodic signals rises above or falls below the desired frequency. Due to the combination of components disclosed herein, the light bulb is positively turned on or positively turned off, without partial illumination or flickering, even though the frequency of the periodic signals closely approximates the desired frequency. Moreover, the hysteresis of the switching operation of the invention may be conveniently controlled by the novel apparatus disclosed herein.

Of course, the switch means of the invention may be adapted to energize apparatus, such as a brake or electrical control circuitry, in addition to visual indicating apparatus, such as a light bulb.

DESCRIPTION OF THE DRAWINGS

These and other advantages and features of the present invention will be described for purposes of illustration, but not of limitation, in connection with the accompanying drawings, wherein like numbers refer to like parts throughout, and wherein:

FIG. 1 is a block diagram, schematic representation of a preferred form of apparatus made in accordance with the present invention;

FIG. 2 is a detailed schematic drawing of one form of the variable resistance device, charging circuit, negative resistance device, switch means, and output means shown in FIG. 1;

FIG. 3 is a preferred embodiment of the variable resistance device, charging circuit, negative resistance device, switch means, and output means shown in FIG. 1; and FIG. 4 is a detailed schematic drawing showing an exemplary signal shaper adapted for use in connection with the present invention.

DESCRIPTION OF THE PREFERRED EMBODIMENTS

Referring to FIG. 1, a preferred form of the present invention includes a signal shaper 12 that receives periodic electrical signals from a signal source 10 and transforms the signals into positive pulses having a duration of about 0.5 to 10.0 milliseconds. The shaped signals are used to operate a variable resistance device 14 that discharges a capacitor in a charging circuit 16 upon the receipt of each one of said periodic signals. Charging circuit 16 is connected to a voltage responsive, negative resistance device 18 that is designed to be switched to its negative resistance mode of operation if the voltage across the charging circuit attains a predetermined voltage. Charging circuit 16 is adjusted so that it is discharged by the variable resistance device before it charges to the predetermined voltage if the frequency of the periodic signals is greater than a predetermined frequency. When the frequency of the periodic signals declines to the predetermined frequency, the charging circuit has sufficient time to build up to a voltage that switches the negative resistance device. Switching the negative resistance device energizes a switch means 20 that, in turn, deenergizes a normally energized output means 22. Accordingly, the output means is energized whenever the frequency of the periodic signals is greater than the predetermined frequency, and is deenergized whenever the frequency of the periodic signals is less than the predetermined frequency.

A preferred form of variable resistance device 14, charging circuit 16, negative resistance device 18, switch means 20, and output means 22 is shown in detail in FIG. 2.

Variable resistance device 14 includes a transistor 30 comprising a base or control lead 31 that is connected to bias resistors 32 and 34, and a transconductive path extending from a collector lead 33 through the collector-emitter junction of the transistor to ground potential. Collector lead 33 is connected through a resistor 36 to a positive voltage supply conductor 51. The variable resistance device also comprises a diode 38 that allows current to flow from charging circuit 16 through the transconductive path of transistor 30, but blocks current tending to flow in the opposite direction.

Charging circuit 16 comprises a resistive circuit path, including resistor 46 and the emitter-collector junction of a transistor 44, through which a charging capacitor 52 is charged. The rate at which capacitor 52 is charged is determined by the voltage on arm 42 of potentiometer 40 that is connected to the base lead of transistor 44. The voltage appearing across potentiometer 40, in turn, is largely determined by the value of resistor 48. Transistor 50 has its collector lead connected to positive voltage supply conductor 51, its emitter lead connected to a voltage dividing circuit comprising resistors 54 and 56, and its base lead connected to the junction of diode 38, capacitor 52, and the collector lead of transistor 44. Resistor 54 is connected to a capacitor 58 that tends to maintain voltage across the negative resistance device if the device is switched to its negative resistance mode of operation.

Negative resistance device 18 comprises a tunnel diode 60 having an anode connected to the junction of resistor 54 and capacitor 58. Those skilled in the art will appreciate that tunnel diodes have unique characteristics that, in part, provide the present invention with its exceptional accuracy and rapid switching speed.

Switch means 20 comprises a transistor 62 having its base lead connected to the anode of tunnel diode 60 and its collector lead connected over resistor 64 to a positive voltage supply conductor 65. The collector lead of transistor 62 is also connected to a capacitor 66 that integrates the pulses of current produced by the switching of tunnel diode 60 and the resulting operation of transistor 62. Resistors 68 and 70 provide the proper biasing potential for a transistor 72 that amplifies the signal received from transistor 62. The collector lead of transistor 72 is connected over a resistor 74 to supply conductor 65 and is connected over a resistor 76 to the base lead of transistor 80. Resistor 78 provides a proper biasing voltage for transistor 80. Transistor 80 amplifies the signal received from transistor 72 and drives output means 22 which comprises a light bulb 82.

The operation of the apparatus shown in FIG. 2 will now be explained assuming that signal source 10 represents the ignition system of an automobile engine and that leads 11 and 13 are respectively connected to the distributor breaker points and the ground potential conductor thereof. When the engine is running, signals having a periodic peak in their waveform will be conducted over conductor 11 to signal shaper 12 in a well-known manner. As will be described in more detail hereafter, signal shaper 12 transforms the positive peaks conducted over conductor 11 into positive-going pulses (such as those identified by the letter A) having a duration of about 0.5—10 milliseconds. The positive-going pulses are conducted over lead 15 and resistor 32 to the base lead of transistor 30, thereby causing the transistor to conduct current from its collector to emitter leads (i.e., through its transconductive path). As soon as transistor 30 conducts, any charge present on capacitor 52 is immediately discharge through diode 38 and the transconductive path to ground potential. As the trailing edge of each pulse on conductor 15 is impressed on the base lead of transistor 30, the transistor returns to its nonconductive state, diode 38 is reversed biased, and capacitor 52 begins to charge through resistor 46 and the emitter-collector junction of transistor 44.

Transistor 50 is connected in an emitter-follower arrangement and provides a relatively high input impedance so that current leakage from capacitor 52 is held to a minimum. The voltage at the emitter lead of transistor 50 is proportional to the voltage across capacitor 52 and is applied through resistor 54 to the anode of tunnel diode 60. As is well known to those skilled in the art, the current flowing through a tunnel diode initially increases as the forward conducting voltage across the diode increases. Accordingly, as capacitor 52 begins to charge, most of the current flowing through resistor 54 is conducted through tunnel diode 60 so that transistor 62 remains in its nonconducting state. However, as the forward conducting voltage of the diode is increased beyond a predetermined value, the current flowing through the diode rapidly decreases (exhibiting a so-called negative resistance mode of operation) so that most of the current flowing through resistor 54 is conducted through the base circuit of transistor 62, thereby causing transistor 62 to switch to its conductive state.

The apparatus shown in FIG. 2 is adjusted in the following manner. Assuming the engine is operating at a desired speed so that periodic pulses are received by transistor 30 at a desired frequency, arm 42 of potentiometer 40 is adjusted in order to increase the charging rate of capacitor 52 until the voltage built-up on capacitor 52 between the receipt of periodic pulses by transistor 30 reaches a predetermined value sufficient to switch tunnel diode 60 into its negative resistance mode of operation. As previously explained, when tunnel diode 60 is switched in the manner indicated, transistor 62 is switched to its conductive state, thereby causing transistor 72 to be switched to its nonconductive state. As a result, transistor 80 is also switched to its nonconductive state so that current no longer flows through light bulb 82, and the bulb is thereby turned off. As soon as a periodic pulse is received by transistor 30, capacitor 52 is discharged and tunnel diode 60 is returned to its initial operating mode. Transistor 62 then returns to its nonconductive state. However, transistors 72 and 80 do not immediately return to their conductive states due to the integrating action of capacitor 66, and light bulb 82 remains extinguished as long as the frequency of the periodic pulses remains at or below the desired rate.

When the apparatus of FIG. 2 has been adjusted in the above-described manner, an increase in the frequency of the periodic pulses to a value slightly greater than the desired frequency causes transistor 30 to be switched to its conductive state prior to the time that capacitor 52 charges to the predetermined voltage that will switch tunnel diode 60. Transistor 62 then remains in its nonconductive state and the voltage across capacitor 66 rapidly increases to a value sufficient to switch transistors 72 and 80 to their conductive states. As a result, bulb 82 is almost instantaneously lighted.

If the frequency of the periodic pulses again declines to the desired frequency, capacitor 52 again has time to charge to the predetermined voltage at which tunnel diode 60 is switched to its negative resistance mode of operation. At this instant in time, as previously explained, transistor 62 is switched to its conductive state and transistors 72 and 80 are switched to their nonconductive states so that light bulb 82 is immediately turned off. The novel arrangement of components in switch means 20 causes the light bulb to be extinguished instantaneously when the frequency of the periodic signals decreases to its desired frequency, thus providing an instantaneous indication that the engine is operating at or below its desired speed. Moreover, there is no flicker of the light bulb since capacitor 66 integrates the pulses created by the switching operation of transistor 62 in the above-described manner.

Another embodiment of the present invention is shown in FIG. 3 wherein variable resistance device 14 comprises the same components illustrated in FIG. 2 and is connected to the same source of signals discussed in connection with FIG. 2.

Referring to FIG. 3, charging circuit 16 comprises a potentiometer 112 having an adjusting arm 110 that is connected to a positive voltage supply conductor 113, and a resistor 114 through which charging current flows to a capacitor 116.

Negative resistance device 18 comprises a programmable unijunction transistor 118 (hereafter called PUT 118) such as the device manufactured by the General Electric Company under Stock Number D13 T1. PUT 118 has an anode 120 connected to the junction of resistor 114 and capacitor 116, a gate 122 connected to the junction of resistors 128 and 130, and a cathode 124 connected over a resistor 126 to ground potential. Resistors 128 and 130 establish a predetermined voltage at gate 122 that determines the voltage required in order to switch the anode circuit of PUT 118 (extending from anode 120 to cathode 124) from its nonconductive to its conductive state. The use of a PUT in the present invention offers advantages of control unattainable by the use of other negative resistance devices. Moreover, such a device provides a means of controlling the hysteresis of switch means 20 in a manner described hereafter.

Switch means 20 basically comprises a transistor 136 that has its base lead connected over a resistor 134 to the junction of cathode 124 and resistor 126. The collector lead of transistor 136 is connected to a resistor 138 that provides a charging path for a capacitor 140. The collector lead is also connected over resistor 142 to the base lead of a transistor 144. Resistor 146 is used to bias transistor 144. Transistor 144 is connected to a transistor 148 in order to form a Darlington amplifier. The collector of transistor 148 is connected through a load resistor 150 to ground potential and through a light bulb 154 to a positive voltage supply conductor 156.

The operation of the embodiment shown in FIG. 3 is somewhat similar to the operation of the apparatus described in FIG. 2. More specifically, when positive pulses from signal shaper 12 are received at a frequency greater than the desired frequency, capacitor 116 is discharged through transistor 30 upon the receipt of each pulse and is thereby maintained at a voltage insufficient to actuate the normally nonconductive PUT 118. As a result, transistor 136 is maintained in its nonconductive state and capacitor 140 is allowed to charge to a voltage sufficient to maintain transistors 144 and 148 in their conductive states, thereby causing light bulb 154 to be lighted.

In order to adjust the apparatus, the frequency of the periodic pulses is reduced to the desired frequency, and arm 110 is adjusted so that capacitor 116 is allowed to charge to a voltage just sufficient to operate PUT 118 between the receipt of periodic pulses by transistor 30. That is, capacitor 116 is allowed to charge to a threshold voltage slightly larger than the voltage impressed on gate 122 through resistors 128 and 130. When the threshold voltage is reached, PUT 118 develops a negative resistance and the anode circuit becomes conductive, thereby allowing capacitor 116 to discharge through resistor 126 to ground potential. When the anode circuit of PUT 118 becomes conductive, a positive voltage is developed across resistor 126, and transistor 136 is thereby switched to its conductive state. Capacitor 140 is then immediately discharged through transistor 136, and transistors 144 and 148 are instantaneously switched to their nonconductive states. As a result, light 154 is immediately turned off since resistor 150 does not allow the conduction of sufficient current to cause light 154 to be lighted. According to the foregoing mode of operation, as soon as the frequency of the periodic electrical signals from signal shaper 12 decreases below the predetermined frequency at which potentiometer 112 was adjusted, light 154 is immediately turned off, thereby providing a positive frequency indication.

After PUT 118 has been actuated, the receipt of the next periodic pulse causes capacitor 116 to discharge and causes PUT 118 to be reset to its nonconducting state. As soon as PUT 118 is reset, transistor 136 is again switched to its nonconductive state, and capacitor 140 begins to charge through resistor 138. However, assuming the frequency of the periodic pulses remains the same, capacitor 116 again charges to the threshold voltage, and capacitor 116 is discharged through the anode circuit of PUT 118. Transistor 136 is then switched to its conductive state, so that capacitor 140 is quickly discharged. As a result, as long as the frequency of the periodic signals remains at or below the desired frequency, transistor 136 periodically discharges capacitor 140 before it can build up to a voltage sufficient to switch transistors 144 and 148 to their conductive states. Accordingly, light 154 remains continuously turned off, without flickering, as long as transistor 136 is being periodically operated by PUT 118.

If the frequency of the periodic signals increases above the desired frequency, capacitor 116 is discharged before it can build up to the threshold voltage. As a result, transistor 136 remains in its nonconductive state, and capacitor 140 charges to a voltage sufficient to cause transistors 144 and 148 to be switched to their conductive states by the time two or three periodic pulses have been received. As a result, light 154 provides a near instantaneous and positive indication when the frequency of the periodic electrical pulses exceeds the desired frequency.

According to a novel feature of the present invention, the hysteresis of the switch means shown in FIG. 3 may be controlled by a variable resistor 160 that is connected between capacitor 140 and gate 122. Those skilled in the art will recognize that PUT 118 is actuated each time the voltage on anode 120 exceeds the voltage on the gate 122. As a result, the threshold voltage of PUT 118 (i.e., the voltage on anode 120 that is required in order to cause the anode circuit to become conductive) may be controlled by altering the voltage of gate 122. For example, if the frequency of the periodic signals is lower than the desired frequency, the average voltage across capacitor 140 is relatively low, and the voltage at gate 122 is reduced accordingly due to current flow through resistor 160. As a result, a considerable increase in frequency is required in order to prevent capacitor 116 from charging to the threshold voltage. Once the critical frequency has been exceeded, the average voltage across capacitor 140 becomes relatively high, and the voltage at gate 122 is increased accordingly through resistor 160. Thereafter, a considerable decrease in frequency is required in order to allow capacitor 116 to charge to the increased threshold voltage. By means of the novel circuit described above, the invention exhibits a hysteresis characteristic that is extremely valuable for certain applications.

Those skilled in the art will appreciate that a variety of signal shapers may be used in connection with the present invention depending on the type of signal produced by signal source 10. A particularly reliable and accurate signal shaper for use in connection with an automotive ignition system is illustrated in detail in FIG. 4.

Referring to FIG. 4, conductor 11 is connected to the breaker points of the ignition system and conductor 13 is connected to ground potential of the automobile electrical system being operated. Conductors 11 and 13 are connected to an ordinary tachometer 200 that is capable of producing positive-going voltage pulses on conductor 202. Those skilled in the art will appreciate that a variety of commercially available tachometers fulfill the foregoing requirement. Conductor 202 is connected through a capacitor 204 and a resistor 206 to the gate of a programmable unijunction transistor 208 (hereinafter called PUT 208). The gate is connected to the junction of resistors 210 and 212 that, in turn, are connected between ground potential and positive voltage supply conductor 113. A Zener diode 214 is also connected between conductor 113 and ground potential. The anode of PUT 208 is connected over a resistor 216 to ground potential, over a resistor 218 to supply conductor 113, and over a capacitor 220 to the base of a transistor 222. The base is biased through a resistor 224 so that transistor 222 is normally in its conductive state. If transistor 222 is in its conductive state, current is drawn through resistor 226 so that the voltage on conductor 15 is relatively low. As a result, transistor 30 (that is connected to conductor 15 through resistor 32) is held in its nonconductive state. When a positive-going pulse is received from tachometer 200, the anode circuit of PUT 208 is switched from its nonconductive to its conductive state upon receipt of the trailing edge of the pulse. Capacitor 220 is then discharged through the anode circuit so that the voltage on the base of transistor 222 momentarily decreases sufficiently to turnoff the transistor. As a result, the voltage on conductor 15 forms a positive-going pulse that switches transistor 30 to its conductive state in the manner previously described.

Those skilled in the art will recognize that a variety of signal-shaping circuits, other than the circuit shown in FIG. 4, may be used in connection with the present invention, depending on the type of periodic signal produced by signal source 10. Moreover, it will be apparent that switch means 20 may be adapted to drive a relay or a variety of other electrical control devices in response to the operation of the frequency detection apparatus described herein. It should be noted that the output means may be either energized or deenergized when the frequency of the periodic signals is greater than the predetermined frequency, depending on the manner in which the output means is connected to the switch means.

Those skilled in the art will also appreciate that various other changes and modifications in certain of the components described herein may be made without departing from the spirit and scope of the present invention.

I claim:

1. Apparatus for determining whether the variable input frequency of a series of periodic electrical signals is greater than or less than a predetermined frequency, comprising in combination:

a first capacitor;

a first resistive circuit path connecting said first capacitor to a unidirectional voltage source such that said first capacitor is thereby charged at a predetermined rate;

first variable resistance means having a control electrode adapted to receive said periodic electrical signals and having a transconductive path connected to said first capacitor, said transconductive path being periodically rendered conductive in response to said periodic electrical signals so that said first capacitor is thereby discharged;

output means for performing an indicating or control function;

a second capacitor;

a second resistive circuit path for charging said second capacitor at a predetermined rate;

second variable resistance means connected to said second capacitor so that said second capacitor is discharged in response to signals received by said second variable resistance means;

means for operating said output means when said second capacitor charges to a predetermined voltage;

voltage responsive means operatively connected between said first capacitor and said second variable resistance means for actuating said second variable resistance means in response to a predetermined voltage across said first capacitor; and means for adjusting the charging rate of said first capacitor so that the frequency at which said second variable resistance means is actuated may be altered.

2. Apparatus, as claimed in claim 1, and further comprising:

a bias circuit that applies a bias voltage to a gate circuit of said voltage responsive means in order to establish the magnitude of voltage which must be applied to an anode circuit of said voltage responsive means in order to make said anode circuit become conductive; and a third resistive circuit path connected between said second capacitor and said bias circuit so that an increase in voltage across said second capacitor increases the bias voltage applied to the voltage responsive means by the bias circuit whereby the voltage which must be applied to said anode circuit in order to make said anode circuit become conductive is increased.

3. Apparatus, as claimed in Claim 2, wherein said voltage responsive means comprises a unijunction transistor.